G. B. MARTIN.
NUT LOCK.
APPLICATION FILED MAR. 12, 1909.
939,048.
Patented Nov. 2, 1909.
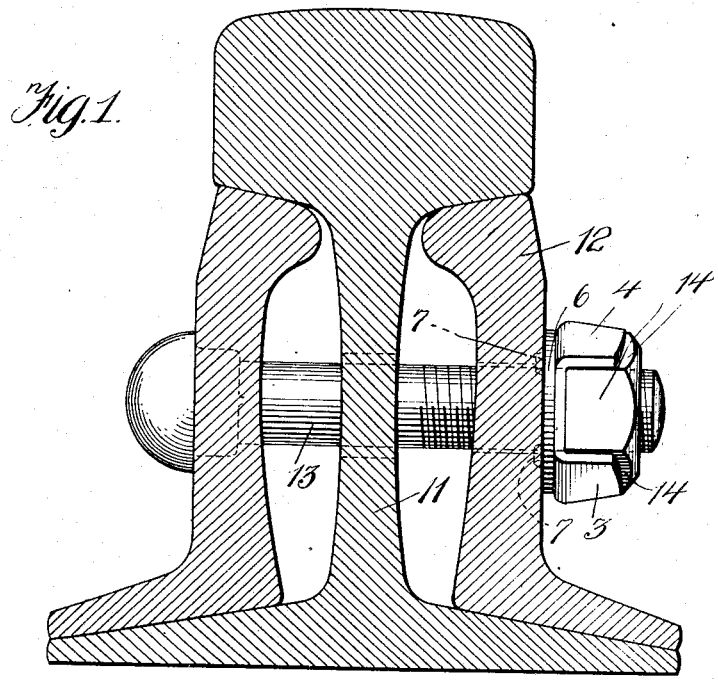
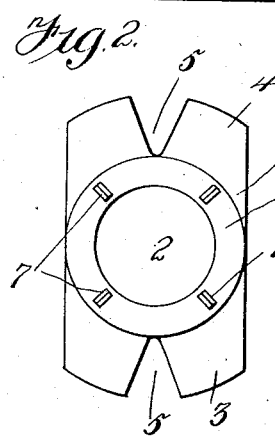 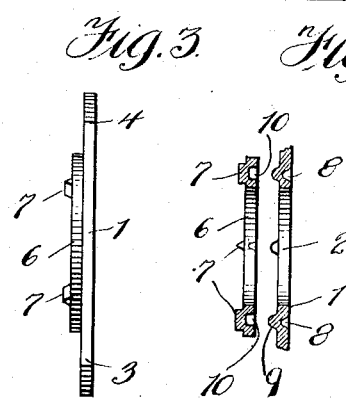
Witnesses
Samuel Payne
N. H. Butle
Inventor
G. B. Martin
By H. C. Evert & Co.
Attorneys

UNITED STATES PATENT OFFICE.

GEORGE B. MARTIN, OF MARIETTA, OHIO.

NUT-LOCK.

939,048.

Specification of Letters Patent.　　Patented Nov. 2, 1909.

Application filed March 12, 1909.　Serial No. 482,893.

*To all whom it may concern:*

Be it known that I, GEORGE B. MARTIN, a citizen of the United States of America, residing at Marietta, in the county of Washington and State of Ohio, have invented certain new and useful Improvements in Nut-Locks, of which the following is a specification, reference being had therein to the accompanying drawing.

This invention relates to nut locks, and the objects of my invention are, first, to provide a novel washer that can be mounted upon a bolt and bent to prevent a nut screwed upon the bolt from rotating; second, to provide a nut lock that can be advantageously used in connection with rail joints or structures subjected to vibrations; and third, to provide a simple and durable locking washer that will not injure a bolt or nut in connection with which it is used and will permit of the nut being removed from the bolt at any time.

The above objects are attained by a nut locking device that will be presently described and then claimed.

In the drawings:—Figure 1 is a side elevation of my nut lock as applied to a rail joint, Fig. 2 is a front elevation of the locking washer, Fig. 3 is an edge view of the same, and Fig. 4 is a vertical sectional view of a portion of the locking washer with the parts thereof separated.

Referring to the drawings in detail, 1 designates a substantially rectangular washer formed of malleable metal, the opening thereof being indicated by the reference character 2. Each end of the washer is provided with a V-shaped notch to form two pairs of bendable wings, the wings of one pair being indicated by the reference character 3 and the wings of the other pair by the reference character 4. By providing the V-shaped notches 5, each of the wings can be independently bent and furthermore said notches provide a clearance for the corners of the nut 14 when bending the wings to engage the sides of the nut, the clearance being necessary owing to the fact that the nut 14 is hexagonal.

In connection with the malleable washer 1, I use an annulus or ring 6 which is made of a material similar to the washer 1. This ring or annulus 6 is punched upon one side to provide four equally spaced lugs 7 upon the opposite side, and then the ring and lugs are case-hardened.

To secure the washer 1 to the ring 6, said washer adjacent to the opening 2 and at four equally spaced points corresponding to the lugs 7 is punched upon one side, as at 8, to provide protuberances 9 upon the opposite side, these protuberances fitting in the punched recesses 10 of the ring or annulus 6.

After the washer and ring are assembled with the protuberances 9 extending into the recesses 10, the washer and ring are electrically welded at the protuberances 9, whereby the ring 6 will practically form an integral part of the washer 1.

It is necessary that I make the ring 6 and the washer 1 separate in order that the ring can be case-hardened.

In Fig. 1 of the drawings, I have illustrated a rail joint wherein the rail 11 is braced by splice bars 12, these splice bars being held in engagement with the rail 11 by a bolt 13 and a nut 14 screwed upon said bolt. Prior to screwing the nut 4 upon the bolt, the locking washer is slipped upon the bolt 13 with the case-hardened lugs 7 confronting the splice bar 12. As the nut 14 is screwed upon the bolt and impinges the washer 1, the case-hardened lugs 7 are forced into the splice bar 12, these lugs preventing the locking washer from rotating relative to the splice bar 12. The malleable wings 4 are then bent downwardly upon the sides of the nut 14, thus preventing the nut from rotating upon the bolt 13. Since the prongs 4 are made of a malleable material, the wings can be bent upwardly by use of a suitable instrument (not shown) when it is desired to remove the nut from the bolt 13.

Besides being applicable to rail joints, my nut lock can be used in connection with rolling stock, bridges and structural steel works subjected to vibrations.

While in the drawings forming a part of this application, there is illustrated the preferred embodiments of my invention, it is obvious that the elements therein can be varied or changed without departing from the spirit of the invention.

Having now described my invention what I claim as new, is:—

A nut lock comprising a malleable washer substantially rectangular in contour and having each end provided with a cut-away portion to form a washer with pairs of wings, said cut-away portions constituting clearances for the corners of a nut when the wings are bent to engage the sides thereof, said washer provided with protuberances, and an annulus having one side formed with recesses and its other side provided with case-hardened lugs, said protuberances adapted to extend in said recesses and electrically welded to the walls of the recesses whereby the annulus and washer are connected together.

In testimony whereof I affix my signature in the presence of two witnesses.

GEORGE B. MARTIN.

Witnesses:
 WM. M. SPRAGUE,
 C. W. SHRODES.